US008772417B2

(12) United States Patent
Xiao et al.

(10) Patent No.: US 8,772,417 B2
(45) Date of Patent: Jul. 8, 2014

(54) POLYIMIDE MEMBRANES AND THEIR PREPARATION

(75) Inventors: Youchang Xiao, Singapore (SG); Tai-Shung Chung, Singapore (SG); Mei Ling Chua, Singapore (SG); Mohammad Askari, Singapore (SG); Rui Chin Ong, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 13/640,439

(22) PCT Filed: Apr. 12, 2011

(86) PCT No.: PCT/SG2011/000144
§ 371 (c)(1),
(2), (4) Date: Oct. 10, 2012

(87) PCT Pub. No.: WO2011/129769
PCT Pub. Date: Oct. 20, 2011

(65) Prior Publication Data
US 2013/0046057 A1 Feb. 21, 2013

Related U.S. Application Data

(60) Provisional application No. 61/322,951, filed on Apr. 12, 2010.

(51) Int. Cl.
*C08L 77/00* (2006.01)

(52) U.S. Cl.
USPC ........... 525/434; 525/420; 525/436; 528/350; 528/353

(58) Field of Classification Search
USPC ................ 525/420, 434, 436; 528/350, 353
See application file for complete search history.

(56) References Cited

U.S. PATENT DOCUMENTS

| | | | |
|---|---|---|---|
| 4,705,540 A | 11/1987 | Hayes | |
| 4,717,393 A | 1/1988 | Hayes | |
| 4,717,394 A | 1/1988 | Hayes | |
| 4,897,092 A | 1/1990 | Burgoyne et al. | |
| 5,709,733 A | 1/1998 | Hachisuka et al. | |
| 5,969,087 A | 10/1999 | Maeda | |
| 6,232,428 B1 | 5/2001 | Deets et al. | |
| 6,497,747 B1 | 12/2002 | Ding et al. | |
| 6,709,491 B2 | 3/2004 | Kawakami et al. | |
| 2006/0156920 A1 | 7/2006 | Ekiner et al. | |
| 2009/0165645 A1* | 7/2009 | Wind et al. | 95/51 |

FOREIGN PATENT DOCUMENTS

| | | |
|---|---|---|
| EP | 0407172 | 1/1991 |
| EP | 1567250 | 4/2009 |
| WO | 2009/099109 | 8/2009 |

OTHER PUBLICATIONS

Koros, W.J., Kratochvil, A.M.; Macromolecules, 2008, vol. 41, p. 7920-7927.*
Xiao, Y. et al., "Grafting Thermally Labile Molecules on Cross-linkable Polyimide to Design Membrane Materials for Natural Gas Purification and $CO_2$ Capture", Energy Environ. Sci., 2011, 4, pp. 201-208.
Lan Ying Jiang and Tai Shung Chung, "β-Cyclodextrin containing Matrimid® sub-nanocomposite membranes for pervaporation application," Journal of Membrane Science 327 (2009) 216-225.
Eric S. Peterson et al,, "Polyimide and Polybenzimidazole Derivatives for Gas Separation Applications," Idaho National Laboratory, May 2007 Carbon Capture and Sequestration Conference.
D. Ayala et al., "Gas separation properties of aromatic polyimides," Journal of Membrane Science 215 (2003) 61-73.
Hailin Cong et al., "Polymer-inorganic nanocomposite membranes for gas separation," Separation and Purification Technology 55 (2007) 281-291.
H. Kawakami et al., "Gas separation characteristics of isomeric polyimide membrane prepared under shear stress," Journal of Membrane Science 211 (2003) 291-298.
Lloyd S. White et al., "Properties of a polyimide gas separation membrane in natural gas streams," Journal of Membrane Science 103 (1995) 73-82.
E.K. Chatzidaki et al., "New polyimide-polyaniline hollow fibers: Synthesis, characterization and behavior in gas separation," European Polymer Journal 43 (2007) 5010-5016.
Shu-Hsien Huang et al., "Gas separation properties of aromatic poly(amide-imide) membranes," European Polymer Journal 42 (2006) 140-148.
Lan Ying Jiang et al., "Polyimides membranes for pervaporation and biofuels separation," Progress in Polymer Science 34 (2009) 1135-1160.

* cited by examiner

*Primary Examiner* — Robert Jones, Jr.
(74) *Attorney, Agent, or Firm* — Cesari and McKenna, LLP

(57) ABSTRACT

Disclosed are (1) a method of preparing a polyimide membrane, including cross-linking polyimides via thermal labile side chains and decomposition of the thermal labile side chains; and (2) polyimide membranes thus prepared.

22 Claims, No Drawings

POLYIMIDE MEMBRANES AND THEIR PREPARATION

CROSS-REFERENCE TO RELATED APPLICATIONS

This application is the National Stage of International Application No. PCT/SG2011/000144, filed on Apr. 12, 2011, which claims the benefit of the priority date of U.S. Provisional Application No. 61/322,951, filed on Apr. 12, 2010. The contents of these applications are hereby incorporated by reference in its entirety.

BACKGROUND OF THE INVENTION

Membrane technology is extensively applied to gas separation. For this application, high gas permeability and gas pair selectivity are the two most important criteria for choosing membrane materials. See, e.g., P. Bernardo, et al., *Ind. Eng. Chem. Res.*, 48, 2009, 4638 and V. Abets, et al., *Adv. Eng. Mater.* 8, 2006, 328.

Cross-linked aromatic polyimide materials have received much attention for use in gas separation. Methods to cross-link aromatic polyimides include ultraviolet irradiation of benzophenone-containing polyimide chains, thermal treatment of polyimide chains containing acetylene end groups, and cross-linking polyimide chains by small molecules with multiple reactive groups. See H. Kita, et al., *J. Membrane. Sci.* 87, 1994, 139; Y. Xiao, et al., *J. Membrane. Sci.*, 302, 2007, 254; and C. Staudt-Bickel et al., *J. Membr. Sci.*, 155, 1999, 145. These methods tend to increase chain packing and inhibit intra-segmental and inter-segmental mobility among chains, resulting in improved gas pair selectivity but sacrificing gas permeability.

There is a need for improved polyimide membranes that can be used in gas purification with both high gas permeability and gas pair selectivity.

SUMMARY OF THE INVENTION

One aspect of this invention relates to a method of preparing a polyimide membrane.

This method includes four steps:

(1) providing a solution containing a solvent (e.g., dichloromethane) and grafted polyimides, the grafted polyimides having molecular weights of 10,000-300,000 (e.g., 30,000-70,000) and containing monomers A and, optionally, also containing monomers B.

Each of the monomers A, which might be the same or different, has the following formula:

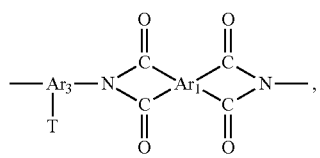

A and

Each of the monomers B, which might be the same or different, has the following formula:

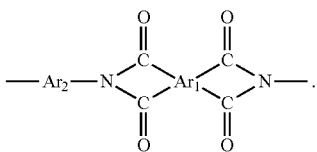

B

In these two formulas,
each of the $Ar_1$ moieties, independently, is

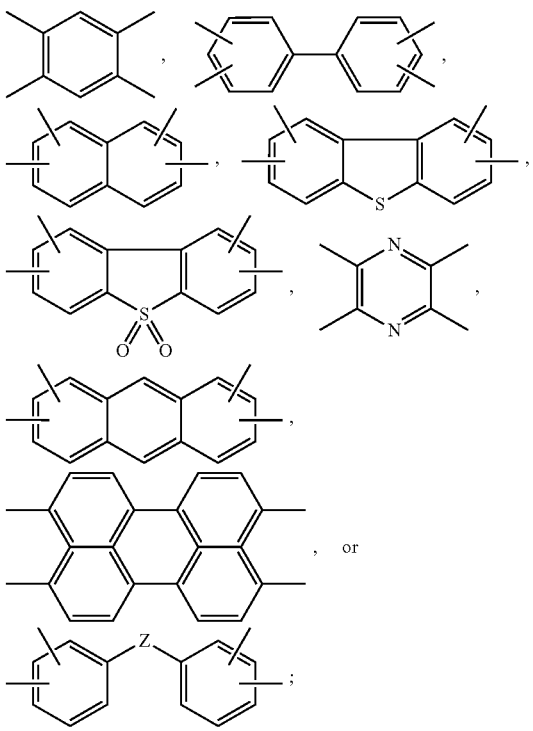

each of the Z moieties, independently, being $C(CF_3)_2$, $C(=O)$, O, S, $S(O_2)$, $C(CH_3)_2$, $CH_2$, or $O(-Ph-)O$;
each of the $Ar_2$ moieties, independently, is

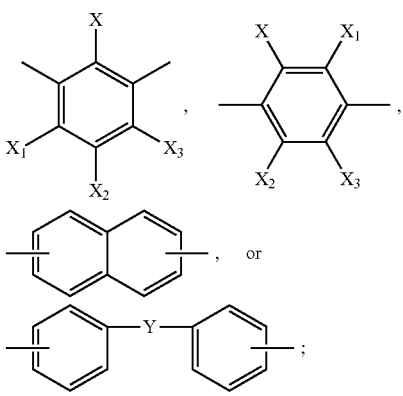

each of the X, $X_1$, $X_2$, and $X_3$, independently, being H, $C_1$-$C_5$ alkyl, $C_1$-$C_5$ alkoxyl, phenyl, and phenyoxyl; and each of the Y moieties, independently, being $C(CF_3)_2$, $C(=O)$, O, S, $S(O_2)$, $C(CH_3)_2$, $CH_2$, or $O(-Ph-)O$;

each of the Ar₃ moieties, independently, is

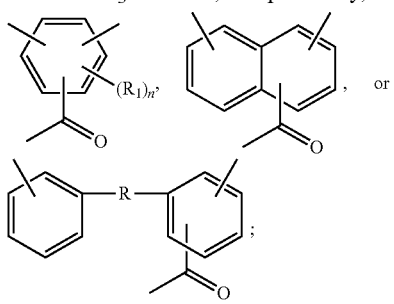

each of the R moieties, independently, being $C(CF_3)_2$, $C(=O)$, O, S, $S(O_2)$, $C(CH_3)_2$, $CH_2$, or $O(-Ph-)O$; each of the $R_1$ moieties, independently, being H, $C_1$-$C_5$ alkyl, $C_1$-$C_5$ alkoxyl, phenyl, and phenyoxyl; and each of the n values, independently, being 0, 1, 2, or 3; and each of the T moieties, independently, is a thermal labile side chain containing a —O— group linked to the carbonyl group in the Ar₃ moiety in a monomer A, and also containing at least one hydroxyl group;

(2) evaporating the solvent to form a membrane from the polyimides;

(3) cross-linking Ar₃ moieties via T moieties by covalent bonding therebetween to form a cross-linked membrane, the covalent bonding resulting from reaction between the hydroxyl group in a T moiety and the carbonyl group in an Ar₃ moiety; and (4) heating the cross-linked membrane at a temperature (e.g., 350-450° C.) so as to both decompose the T moieties and facilitate covalent bonding between aryl rings in the $Ar_1$, $Ar_2$, and $Ar_3$ moieties.

If the grafted polyimides also contain the monomers B, the molar ratio of the monomers B to the monomers A is 0.11 to 99 (e.g., 0.33 to 19), and a monomer A and a monomer B are linked as follows:

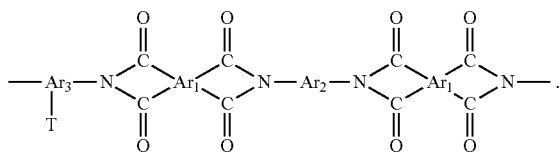

The solution described in step (1) above can further include ungrafted polyimides having molecular weights of 10,000-300,000 (e.g., 30,000-70,000) and containing monomers A' and, optionally, also containing monomers B as defined above. Each of the monomers A', which might be the same or different, has the following formula:

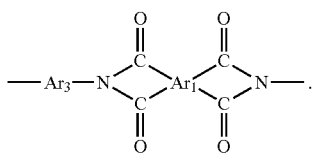

Each of the $Ar_1$ moieties and each of the $Ar_3$ moieties are the same as defined above; and T' is a —OH group, linked to the carbonyl group in the $Ar_3$ moiety in a monomer A'. If the ungrafted polyimides also contain the monomers B, the molar ratio of the monomers B to the monomers A' is 0.11 to 99 (e.g., 0.33 to 19); and a monomer A' and a monomer B are linked as follows:

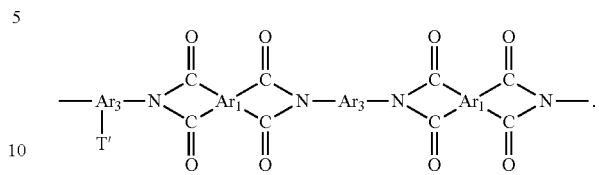

Referring back to the T moieties, they can have the formula: $R_2$—$CH_2$—O—, in which $R_2$ is $C_nH_{2n+2-x}(OH)_x$, x being 2-30 and n being 2-30.

Other examples of the T moieties include:

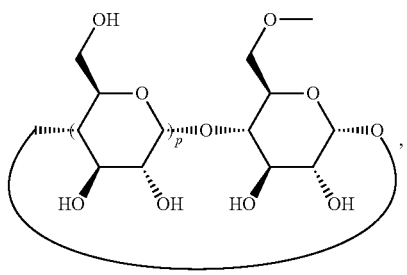

in which p is 0-9; and each of the $X_4$ moieties, independently, is H, $C_1$-$C_5$ alkyl, $C_1$-$C_5$ alkoxyl, phenyl, or phenyoxyl. Specific examples include a beta-cyclodextrin moiety (i.e., p is 6, $X_4$ is H) and a glucose moiety (i.e., p is 0).

Examples of a grafted polyimide include those in which, $Ar_1$

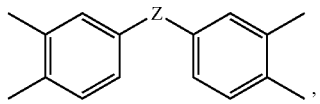

Z being $C(CF_3)_2$; $Ar_2$ is

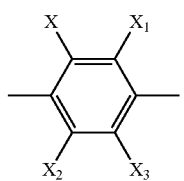

each of X, $X_1$, $X_2$, and $X_3$, being $CH_3$; and $Ar_3$ is

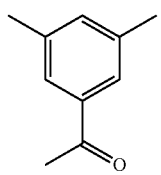

In one embodiment, T is a beta-cyclodextrin moiety; and the monomers B to the monomers A molar ratio is 9. In another embodiment, T is a glucose moiety and the monomers B to the monomers A molar ratio is 1.

Examples of an ungrafted polyimide include those in which, $Ar_1$ is

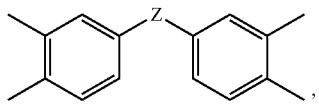

Z being $C(CF_3)_2$; $Ar_2$ is

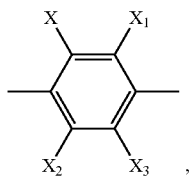

each of X, $X_1$, $X_2$, and $X_3$, being $CH_3$; $Ar_3$ is

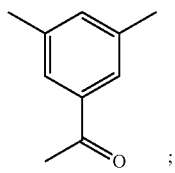

and the monomers B to the monomers A' molar ratio is 1 or 9.

Polyimide membranes prepared by the above-described method are also within the scope of this invention.

The details of one or more examples of the invention are set forth in the description below. Other features, objects, and advantages of the invention will be apparent from the detailed description of the examples and also from the drawing and the appending claims.

DETAILED DESCRIPTION OF THE INVENTION

This invention is based on an unexpected discovery that polyimide membranes prepared by the method described in the "SUMMARY OF THE INVENTION" section above have enhanced gas permeability, enhanced gas pair selectivity, and improved mechanical properties, which can be attributed in part to decomposition of thermal labile side chains.

To prepare a polyimide membrane of this invention, one first provides a solution containing a solvent and grafted polyimides. As pointed out above, the grafted polyimides include thermal labile side chains. These thermal labile side chains decompose when subjected to thermal treatment.

Optionally, the solution also contains ungrafted polyimides, i.e., polyimides that do not include thermal labile side chains.

Both the grafted polyimides and the ungrafted polyimides described herein can be prepared by methods well known in the art. See, e.g., Y. Xiao, et al., Energy Environ. Sci., 2011, 4, 201 and J. Wind, et al., J. Membr. Sci., 2004, 228, 2, 227-236.

The solvent is evaporated to form a membrane. The polyimides in the membrane thus formed are then cross-linked. More specifically, a hydroxyl group in a thermal labile side chain forms a covalent bond with a carbonyl group linked to an aryl group in a grafted polyimide and thereby the grafted polyimides are cross-linked via the thermal labile side chains to form the cross-linked membrane. The grafted polyimides can also cross-link with the ungrafted polyimides when the latter are present. This cross-linking reaction can be induced thermally or by other suitable means.

Finally, the cross-linked membrane is subjected to thermal treatment so that (1) the thermal labile side chains are decomposed to form micro-pores between polyimides, thereby resulting in high permeability of the polyimides membrane; and (2) the carbonyl groups, linked to the thermal labile side chains, are also decomposed and the aryl groups in the polyimides are further cross-linked to form ultra-fine micro-pores that integrally connect with the micro-pores, thereby increasing gas selectivity.

The polyimide membranes thus prepared can be used in gas separation, pervaporation applications, and forward osmosis applications.

Of note, the above-described method can be used to prepare various membranes. Examples include freestanding dense membranes, self supported flat asymmetric membranes (constructed by a porous support layer and a dense selective layer which are made by the same materials), composite flat asymmetric membranes (constructed by a porous support layer and a dense selective layer which are made by different materials), self supported flat symmetric membranes (constructed only by a dense selective layer), hollow fiber asymmetric membranes (constructed by a porous support layer and a dense selective layer which are made by the same materials), and hollow fiber or tubular composite membranes (constructed by a porous support layer and a dense selective layer which are made by different materials).

Without further elaboration, it is believed that one skilled in the art can, based on the disclosure herein, utilize the present invention to its fullest extent. The following specific examples are, therefore, to be construed as merely descriptive, and not limitative of the remainder of the disclosure in any way whatsoever. All publications cited herein are incorporated by reference.

Polyimide Synthesis and Thermal Labile Side Chains Grafting 2,2'-Bis(3,4'-dicarboxyphenyl) hexafluoropropane dianhydride (6FDA) was purchased from Clariant. 3,5-Diaminobenzoic acid (DABA) was purchased from Aldrich and purified by vacuum sublimation before use. 2,3,5,6-Tetramethyl-1,4-phenylenediamine (Durene diamine) was purchased from Aldrich and recrystallized from methanol. N-methyl-pyrrolidone (NMP) was purchased from Merck and distilled at 42° C. under 1 mbar after drying with molecular sieve before use. Other chemicals and solvents (e.g., acetic anhydride, triethylamine, methanol, and beta-cyclodextrin) were purchased from Aldrich and used without further purification. The purities of all tested pure gases were 99.99%.

A. Synthesis of 6FDA-Durene9-DABA1 Copolyimide and Cyclodextrin Grafting

About 2.6 g (15.8 mmol) of Durene diamine and 0.27 g (1.75 mmole) of DABA were fully dissolved in 40 g of NMP in a moisture free flask purged with nitrogen at room temperature. 7.8 g (17.5 mmol) of 6FDA was gradually added to the solution. The solution was allowed to stir for 24 h at room temperature under nitrogen to form a high molecular weight polyamic acid. A mixture of 7.1 g (70.0 mmol) of acetic anhydride and 1.8 g (17.5 mmol) of triethylamine was added slowly into the polyamic acid solution to induce chemical imidization for 24 h under nitrogen atmosphere to form a high molecular weight 6FDA-Durene9-DABA1 copolyimide. The solution was precipitated and washed three times with methanol. After washing, the copolyimide was filtered and dried at 150° C. in vacuum for 24 h.

5 g of 6FDA-Durene9-DABA1 copolyimide was dissolved in 45 g of NMP. Beta-cyclodextrin (beta-CD) was added in excess to the solution and was mixed until it was fully dissolved. 5 mg of p-toluenesulfonic acid was added to the solution. The esterification was carried out by heating the solution at 120° C. under nitrogen atmosphere for 12 h. The resultant Polyimide-g-beta-CD product was precipitated and washed with methanol three times and then dried at 150° C. in vacuum for 24 h.

B. Synthesis of 6FDA-Durene-DABA (5:5) Copolyimide and Glucose Grafting

About 1.5 g (8.8 mmol) of Durene diamine and 1.3 g (8.8 mmole) of DABA were fully dissolved in 40 g of NMP in a moisture free flask purged with nitrogen at room temperature. 7.8 g (17.5 mmol) of 6FDA was gradually added to the solution. The solution was allowed to stir for 24 h at room temperature under nitrogen to form a high molecular weight polyamic acid. A mixture of 7.1 g (70.0 mmol) of acetic anhydride and 1.8 g (17.5 mmol) of triethylamine was added slowly into the polyamic acid solution to induce chemical imidization for 24 h under nitrogen to form a high molecular weight 6FDA-Durene-DABA (5:5) copolyimide. The solution was precipitated and washed three times with methanol. After washing, the polymer was filtered and dried at 150° C. in vacuum for 24 h.

5 g of 6FDA-Durene-DABA (5:5) copolyimide was dissolved in 45 g of NMP. Glucose was added in excess to the solution and was mixed until it was fully dissolved. 5 mg of p-toluenesulfonic acid was added to the solution. The esterification was carried out by heating the solution at 120° C. under nitrogen atmosphere for 12 h. The resultant Polyimide-g-Glucose (PI-g-Glucose) product was precipitated and washed with methanol three times and then dried at 150° C. in vacuum for 24 h.

Preparation of Polyimide Membranes

6FDA-Durene9-DABA1 copolyimide and Polyimide-g-beta-CD were prepared as flat dense membranes with a weight ratio of 1:1. 2% (w/w) polymer solutions were prepared by dissolving the readily-soluble polyimide powders in dichloromethane. The polymer solutions were filtered using Whatman's filters (1 μm) to remove insoluble materials and dust particles. Then the solutions were cast onto silicon wafers at ambient temperature. Dense membranes were formed after most of the solvent was allowed to evaporate slowly over a period of about 5 days. The residual solvent was removed by placing the dense membranes in a vacuum oven at 200° C. All membranes were cut into circles with a diameter of 38 mm. Only the membranes with a thickness of about 50±5 μm were used in the following studies.

The thermal cure was performed using a Centurion™ Neytech Qex vacuum furnace. During the thermal cure, the temperature was increased to a set point of 300, 350, 400, 425 and 450° C. at a rate of 10° C./min and held there for 2 hr. After completing the thermal treatment process, membranes were cooled naturally in the vacuum furnace to room temperature and stored in a dry box for further studies. All membranes after thermal treatments were flexible and tough enough for the gas permeation measurements. To simplify the sample identification, the cured samples were named as polyimide-curing temperature. For example, PI-g-beta-CD 300 represents a Polyimide-g-beta-CD membrane that has been subjected to thermal treatment at 300° C.

A. Preparation of PI-g-beta-CD 400 Membranes

A 2% (w/w) polymer solution was prepared by dissolving 0.6 g 6FDA-Durene9-DABA1 copolyimide and 0.6 g 6FDA-Durene9-DABA1-g-beta-CD copolyimide in 58.8 g dichloromethane. The polymer solution was filtered using Whatman's filters (1 μm) to remove insoluble materials and dust particles. The solution was then cast onto a silicon wafer with a steel ring that has a diameter of 15 cm. A dense PI-g-beta-CD film with a thickness around 50 μm was formed after most of the solvent was allowed to evaporate slowly over a period of about 5 days at ambient temperature. The film was taken off from the silicon wafer and placed into a vacuum furnace. The thermal cure temperature was increased to 400° C. at a rate of 10° C./min and held there for 2 hr. After completing the thermal treatment process, the resultant film was cooled naturally in the vacuum furnace to room temperature.

B. Preparation of PI-g-Glucose 400 Membranes

A 2% (w/w) polymer solution was prepared by dissolving 0.6 g 6FDA-Durene5-DABA5 copolyimide and 0.6 g 6FDA-Durene5-DABA5-g-CD copolyimide in 58.8 g of NMP. The polymer solution was filtered using Whatman's filters (1 μm) to remove insoluble materials and dust particles. The solution was then cast in a vacuum oven onto a silicon wafer with a steel ring that has a diameter of 15 cm. A dense PI-g-Glucose film with a thickness around 50 μm was formed after most of the solvent was allowed to evaporate slowly in the vacuum oven at 70° C. The film was taken off from the silicon wafer and placed into a vacuum furnace. The thermal cure temperature was increased to 400° C. at a rate of 10° C./min and held there for 2 hr. After completing the thermal treatment process, the resultant film was cooled naturally in the vacuum furnace to room temperature.

Characterization of PI-g-beta-CD Membranes

A. Thermogravimetric Analysis (TGA)

The weight loss of the polyimide during post thermal treatment was characterized by TGA with a TGA 2050 Themogravimetric Analyzer (TA Instruments). The analysis was carried out with a ramp of 10° C./min in a temperature range from 50 to 900° C. The purge gas was $N_2$ and its flow rate was controlled at 50 ml/min.

PI-g-beta-CD membranes with different curing temperatures were tested. Three stages of decomposition were observed. In the first stage, about 10% weight loss occurred in the range of 200~400° C., which was attributed to the release of compounds with IR adsorption at 1700 $cm^{-1}$. This investigation was consistent with other reports about the decomposition of cyclodextrin structure. See L. X. Song, et al., *J. Phys. Chem. A*, 112, 2008, 1134. In addition, no other IR peaks were detected during this temperature range. Therefore, it was concluded that cyclodextrin structure decomposition contributed to the weight loss of the polyimide during 200~400° C. thermal treatment. The second stage of about 5% weight loss was observed from 400~450° C. This temperature range corresponds to the evolution of $CO_2$, which shows a characteristic IR peak at 2350 $cm^{-1}$. The released $CO_2$ was attributed to the decarboxylation of the DABA moiety of the copolyimides. See A. M. Kratochvil, et al., *Macromolecules* 41, 2008, 7920. Meanwhile, the IR spectra of evolved gases exhibited a peak at 1149 $cm^{-1}$ which was indicative of CFx evolution when temperature was increased to 450° C. In the last stage, further 30% weight loss occurred in a range of 500~700° C., accompanied by significant evolution of $H_2O$ (characteristic peaks at 3700~3900 $cm^{-1}$), $CO_2$ (characteristic peak at 2350 $cm^{-1}$), CO (characteristic peaks at 2170 and 2110 $cm^{-1}$), C—N (characteristic peak at 1360 $cm^{-1}$), CFx (characteristic peak at 1149 $cm^{-1}$) and C—O (characteristic peak at 1050 $cm^{-1}$). The released gases arised mainly from the imide and 6FDA groups, which contributed to polyimide backbones.

B. Chemical Bonding Analysis

The chemical bonds in the polymers were investigated by Fourier transform infrared (FTIR) spectroscopy. The FTIR measurements were performed using an attenuated total reflection mode (FTIR-ATR) with a Perkin-Elmer Spectrum 2000 FTIR spectrometer.

The evolution of chemical changes of CD grafted polyimides during pyrolysis was monitored by ATR-FTIR. Compared with the original copolyimide, the polyimide membrane grafted by CD showed a stronger intensity of the characteristic peaks of OH groups of CD at 1620 and 3650 cm$^{-1}$, indicating the successfully esterification between polyimide and CD structure. The intensities of these CD characteristic perks decreased with increasing thermal treatment temperature to 400° C., consistent with the findings of TGA analysis that CD structure was decomposed during the thermal treatment. The intensities of the peaks assigned to a symmetric C=O stretch (1776 cm$^{-1}$), asymmetric C=O stretch (1720 cm$^{-1}$), C—N stretch (1353 cm$^{-1}$), and bending of C=O (741 cm$^{-1}$) were constant until the membranes were thermally treated at 400° C. This result demonstrated that the imide groups of polyimides were stable until 400° C. When a thermal curing temperature of 425° C. was attained, the intensities of peaks at 1600~1580 cm$^{-1}$, representing C—C stretching vibrations in the aromatic ring, were increased. This was attributed to the formation of new covalent bonds between benzene rings. According to TGA results, decarboxylation occurred and radical DABA groups were formed when thermal temperature was increased over 400° C. The two radical DABA groups were linked together to form corresponding biphenyl. See T. P. Eskay, et al., *Energy Fuels*, 10, 1996, 1257. For the membranes cured at 450° C., the absorbance of imide groups was reduced, as the imide ring began to decompose at this temperature. On the other hand, the absorption bands assigned to aromatic C—C stretching vibrations increased, indicating the stronger cross-linking reaction between aromatic rings.

C. Positron Annihilation Lifetime Spectroscopy (PALS) Analysis

PALS analysis was performed following the procedure described in C. L. Staiger, et al., *Chem. Mater.* 20, 2008, 2606; and B. W. Rowe, et al., *Polymer* 50, 2009, 149. The PALS results revealed an increase in o-Ps lifetime as temperature increased from 200 to 425° C., indicating a larger cavity size. The mean cavity radius of each PI-g-beta-CD membrane was calculated using a semi-empirical equation based on a spherical infinite potential well model as shown by the following equation:

$$\tau_3^{-1} = 2\left[1 - \frac{r_3}{r_3 + \Delta r} + \frac{1}{2\pi}\sin\left(\frac{2\pi(r_3)}{r_3 + \Delta r}\right)\right]$$

where Δr is an empirical constant (1.656 Å) obtained by fitting well-defined cavities with known dimensions. The results show that the cavity radius of polyimide, which was centered at about 3.4 Å, increased to 3.8 Å, and the intensity also increased as the thermal treatment temperature increased to 425° C.

D. Wide-Angle X-Ray Diffraction (WAXD) Test

WAXD test was performed to quantitatively measure the interchain spacing of membrane materials with a Bruker X-ray diffractometer (Bruker D8 advanced diffractometer) at room temperature. The d-spacing values are interpreted as the average chain spacing. The measurement was completed in a scan range of 2θ=2.5 to 65.4° with a step increment of 0.02°. Ni-filtered Cu Kα radiation with a wavelength of λ=1.5418 Å was used in the experiments. The average d-spacing was determined based on the Bragg's law:

$$n\lambda = 2d \sin \theta$$

where d is the dimension spacing, θ is the diffraction angle, λ is the X-ray wavelength and n is an integral number (1, 2, 3 . . . ).

Positron annihilation lifetime experiments were performed using a high intense slow positron beam with monoenergy at 5 KeV. The resolution of the positron annihilation lifetime spectrometer was determined by measuring 60 Co and each PAL spectrum contains 2 million counts. The obtained PAL data were fitted into three lifetime components using the PATFIT program which assumes a Gaussian distribution of the logarithm of the lifetime for each component, and also into continuous lifetime distribution using the MELT program.

Wide angle X-ray diffraction patterns of all these polyimides were broad, indicating that they had amorphous structure. The most prominent WAXD peak in the amorphous glassy polymer spectrum was used to estimate the average interchain spacing distance (d-spacing), which was calculated using the Bragg equation. The WAXD test results showed an obvious trend of increasing d-spacing with increasing thermal treatment temperature to 400° C. It was explained by the decomposition of CD structure, by which a lot of voids and channels remain between polyimide chains. On the other hand, it showed a surprising decrease in d-spacing after increasing the heat treatment temperature to 425° C. This confirmed that the polymer chains undergo cross-linking reactions at this high temperature, by which consequently promoted chain packing. The peak moved to a larger theta angle direction, when the thermal treatment temperature was increased to 450° C., indicating that an ordered structure was gradually constructed in the matrix and the distance between chains became smaller during the curing process. The peak position was near 20°, which corresponded to a d-spacing of 4.3 Å.

Gas Permeation Measurements

A. Pure Gas Permeability Test

Pure gas permeabilities were obtained by a constant volume method at 35° C. and 10 atm. A sample membrane was mounted onto a permeation cell and vacuumed at 35° C. for more than 24 hr before the gas permeation test was carried out. To investigate the $CO_2$-induced plasticization behavior of the membranes, the testing pressure was intermittently ramped from 2 to 30 atm. The rate of pressure increase (dp/dt) at a steady state was used for the calculation of gas permeability. The permeability of each gas was obtained from the average value of at least three tests with differences among them smaller than 1%. The ideal selectivity is defined as follows:

$$\alpha_{A/B} = \frac{P_A}{P_B}$$

where $P_A$ and $P_B$ are the permeability of gases A and B, respectively.

Table 1 below summarizes the gas permeabilities (P) of pure $O_2$, $N_2$, $CH_4$, $CO_2$, $C_3H_6$ and $C_3H_8$ through original grafted polyimide and thermal cured polyimides. The permeability of thermal cured polyimides monotonically increased with thermal treatment temperature. In particular, the permeability of PI-g-CD 450 exhibited around 200 times higher than the original PI-g-CD 200. This increase in gas permeability with the aid of thermal treatment was mainly attributed to the decomposition of CD structure. Consistent with WXAD results where d-spacing of polymer chains increased with temperature, the micro-pores attributed to the significant enhancement in gas permeability. However, the gas permeability continuously increased when thermal treatment temperature was over 400° C., even though the WXAD spectra show a better packing behavior of polymer chains.

TABLE 1

| Membranes | Permeability (Barrer*) | | | | | | Permselectivity | | |
|---|---|---|---|---|---|---|---|---|---|
| | $O_2$ | $N_2$ | $CH_4$ | $CO_2$ | $C_3H_6$ | $C_3H_8$ | $O_2/N_2$ | $CO_2/CH_4$ | $C_3H_6/C_3H_8$ |
| PI-g-beta-CD 200 | 11.5 | 2.6 | 1.8 | 56 | — | — | 4.4 | 31 | — |
| PI-g-beta-CD 300 | 56 | 13.6 | 8.4 | 189 | — | — | 4.1 | 23 | — |
| PI-g-beta-CD 350 | 102 | 26.6 | 18 | 357 | 15.7 | 1.3 | 3.8 | 20 | 12 |
| PI-g-beta-CD 400 | 262 | 78 | 58 | 921 | 67 | 6.3 | 3.4 | 16 | 11 |
| PI-g-beta-CD 425 | 1399 | 377 | 247 | 4016 | 635 | 45.3 | 3.7 | 16 | 14 |
| PI-g-beta-CD 450 | 2707 | 523 | 463 | 8000 | 472 | 26.2 | 5.2 | 17 | 18 |

*Barrer = $10^{-10}$ $cm^3$ (STP) cm/($cm^2$ s cmHg)

The gas selectivity did not continuously decrease with an increase in permeability. It increased when the thermal treatment temperature was increased to 425° C. In particular, the selectivity for the $C_3H_6/C_3H_8$ pair increased 30% compared with that cured at 400° C. This phenomenon is in agreement with the WAXD results, indicating that polymer chains undergo cross-linking reactions at 425° C. and consequently promotes chain packing.

The original PI-g-CD 200 membrane was easily swollen by $CO_2$ and the onset of $CO_2$-induced plasticization was at 10 atm. A higher thermal treatment temperature effectively suppressed this undesirable effect. The cured PI-g-CD 425 membrane did not exhibit plasticization up to 25 atm, indicating that the high-temperature induced cross-linking reactions restrict chain movement and enhance polymer chains from $CO_2$-induced plasticization.

B. Mixed Gas Permeability Test

Binary $CO_2/CH_4$ (1:1) gas permeation tests were conducted by a modified constant volume permeation system in which an addition valve at the upstream segment is included to adjust the stage cut and another valve at the downstream port is installed to introduce the accumulated permeate gas to an Agilent 7890 gas chromatography (GC) for the analysis of gas composition. For easy comparison with pure gas tests, the testing pressure of mix gas permeation tests was 20 atm.

Mixed gas tests were performed using a binary feed mixture of 50/50% $CO_2/CH_4$ over a range of −10° C. to 25° C. Table 2 compares the gas transport performance between pure gas and mixed gas tests.

The permeability values in mixed gas tests were lower than those in pure gas tests by a value of 40%~50% for PI-g-CD 300 and PI-g-CD 400 membranes. In addition to a 10° C. difference in testing temperature, the decrease in permeability was mainly due to the competitive sorption in membranes. The gas permeability decreased and $CO_2/CH_4$ selectivity increased with decreasing temperature in all PI-g-CD membranes, except for the case of $CO_2$ permeability in PI-g-CD 400.

The results show that thermally treated PI-g-CD membranes demonstrated excellent $O_2/N_2$, $CO_2/CH_4$ and $C_3H_6/C_3H_8$ separation performance, surpassing the trade-off line. See L. M. Robeson, *J. Membr. Sci.*, 320, 2008, 390. For $O_2/N_2$ separation, PI-g-CD 425 shows better performance than high permeable PIM polymer. For $C_3H_6/C_3H_8$ separation, not only thermal cured PI-g-CD can match in excellence with carbon molecular sieve membranes, but also exhibit much better toughness and flexibility. Since the main released gases from CD decomposition are C2/C3 compounds, the channels connected with micro-pores may possess right characteristics to discriminate $C_3H_6$ and $C_3H_8$.

TABLE 2

| Membrane ID | Temperature (° C.) | $PCO_2$ (Barrer*) | $PCH_4$ (Barrer*) | $PCO_2/PCH_4$ | Activation Energy for $CO_2$ Permeability Ep (kJ/mol) |
|---|---|---|---|---|---|
| PI-g-CD 300 | 35** | 189 | 8.4 | 23 | 4.7 |
| | 25 | 110 | 3.2 | 34 | |
| | 10 | 109 | 2.6 | 42 | |
| | 0 | 104 | 2.1 | 50 | |
| | −10 | 84 | 1.5 | 54 | |
| PI-g-CD 400 | 35** | 921 | 58 | 16 | −2.6 |
| | 25 | 520 | 29 | 23 | |
| | 10 | 552 | 23 | 24 | |
| | 0 | 575 | 21 | 28 | |
| | −10 | 597 | 16 | 38 | |
| PI-g-CD 425 | 35** | 4016 | 247 | 16 | 4.2 |
| | 25 | 4289 | 286 | 16 | |
| | 10 | 4057 | 264 | 17 | |
| | 0 | 3696 | 182 | 20 | |
| | −10 | 3454 | 142 | 24 | |

*Barrer = $10^{-10}$ $cm^3$ (STP) cm/($cm^2$ s cmHg).
**Pure gas permeability data.

Forward Osmosis Application

FO experiments were conducted following the procedure described in K. Y. Wang, et al., *Ind. Eng. Chem. Res.*, 2010, 4824-4831. The cross flow permeation cell was a plate-and-frame design with a rectangular channel on each side of the membrane. There was no spacer in the flow channel. The velocity of the solutions during the FO testing was kept at 0.2 L/min for both the feed and draw solutions which flowed in countercurrent direction through the cell channels. The temperatures of the feed and draw solutions were maintained at ambient conditions. A 2M NaCl solution was used as the draw solution. Deionized (DI) water was used as the feed solution. During the FO experiments, the dilution of the draw solution was ignored, as the ratio of water permeation flux to the volume of the draw solution was less than 2%.

The water permeation flux $J_w$ in $L \cdot m^{-2} \cdot h^{-1}$ (LMH) is calculated from the volume change of the feed or draw solution:

$$J_w = \frac{\Delta V}{A_{\text{eff}} \cdot \Delta t}$$

where ΔV (L) is the volume of water that has permeated across the membrane in a predetermined time Δt (h) during the FO process and $A_{\text{eff}}$ is the effective membrane surface area (m²).

The reverse salt flux (salt reverse-diffusion) from the draw solution to the feed was determined by measuring the salt concentration in the feed solution at the end of each experiment. The salt concentration in the feed was determined by the conductivity measurement based on a calibration curve for the single salt solution. Then, the reverse salt flux, $J_s$ in g·m⁻²·h⁻¹ (GMH), was obtained by considering the increase in the feed salt content:

$$J_S = \frac{\Delta(C_t V_t)}{A_{\text{eff}} \cdot \Delta t}$$

where $C_t$ and $V_t$ are the salt concentration and the volume of the feed at the end of FO tests, respectively.

The table below shows the water permeability and salt permeability of PI-g-Glucose 400 and PI-g-Alpha-CD 400.

TABLE 3

| T (° C.) | Feed | Draw solution | Draw flow rate | Membrane | Water Flux (LMH) | Salt Flux (GMH) |
|---|---|---|---|---|---|---|
| 22 | DI water | 2M NaCl | 0.2 L/min | PI-g-Glucose 400 | 28.9 | 1.3 |
| 22 | DI water | 2M NaCl | 0.2 L/min | PI-g-Alpha-CD 400 | 29.5 | 2.0 |

Pervaporation Application

For testing the performance of the membranes for ethanol dehydration, a feed solution of 85 w/w % ethanol/water was added to a standing steel cell and the permeate pressure was kept at vacuum by a vacuum pump. Permeate samples were collected and analyzed using gas chromotography after 2 hours of conditioning. The computation of flux and separation factor of the membranes was following the method described in Y. Wang, et al., *J. Membr. Sci.*, 2009, 326, 222-233.

For ethanol dehydration, the total flux for PI-g-Glucose 400 membrane is 1650 g/m² hr and the permeate water concentration is 98.9% with the separation factor of 580. The membranes have shown promising performance when compared to other literatures. See I. J. Ball, et al., *Synth. Met.* 1999, 102, 1311-1312, Y. S. Kang, et al., *J. Membr. Sci.* 1990, 51, 215-226, D. Shah, et al., *J. Membr. Sci.* 2000, 179, 185-205, M. D. Jia, et al., *J. Membr. Sci.* 1992, 73, 119-128, P. S. Tin, et al., *Carbon* 2011, 49, 369-375, H. Yanagishita, et al., *J. Membr. Sci.* 1994, 86, 231-240.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other examples are also within the claims.

What is claimed is:

1. A method for preparing a polyimide membrane comprising:

providing a solution containing a solvent and grafted polyimides, the grafted polyimides having molecular weights of 10,000-300,000 and containing monomers A and, optionally, also containing monomers B;

each of the monomers A, which are the same or different, having the following formula:

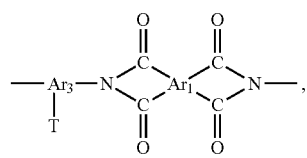

A and each of the monomers B, which are the same or different, having the following formula:

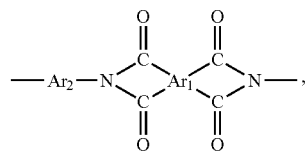

B in which
each of the Ar₁ moieties, independently, is

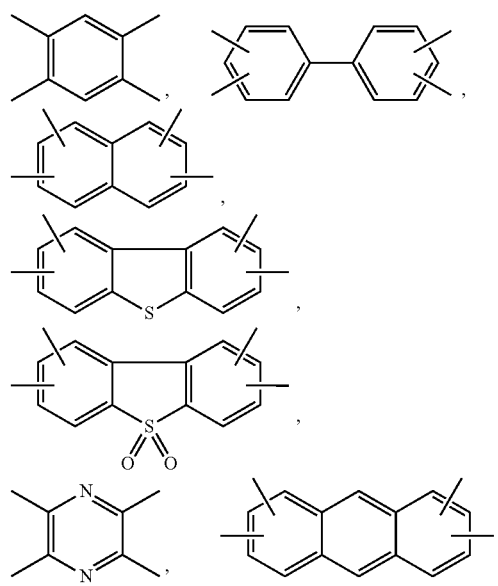

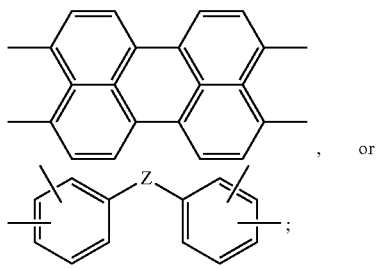, or

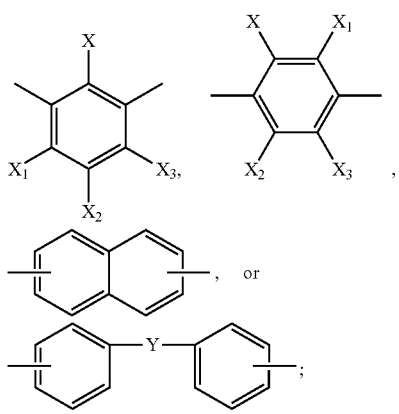;

each of the Z moieties, independently, being $C(CF_3)_2$, $C(=O)$, O, S, $S(O_2)$, $C(CH_3)_2$, $CH_2$, or $O(-Ph-)O$;

each of the $Ar_2$ moieties, independently, is

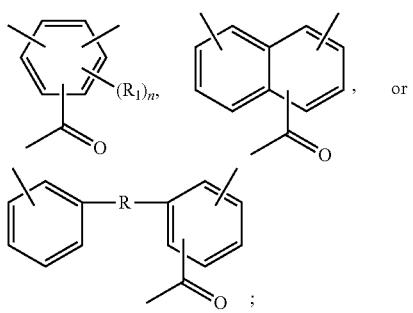

each of the X, $X_1$, $X_2$, and $X_3$, independently, being H, $C_1$-$C_5$ alkyl, $C_1$-$O_5$ alkoxyl, phenyl, and phenyoxyl; and each of the Y moieties, independently, being $C(CF_3)_2$, $C(=O)$, O, S, $S(O_2)$, $C(CH_3)_2$, $CH_2$, or $O(-Ph-)O$;

each of the $Ar_3$ moieties, independently, is

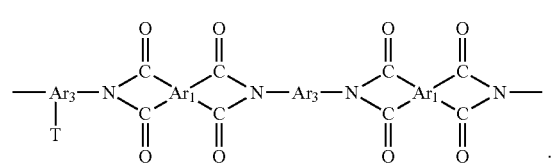

each of the R moieties, independently, being $C(CF_3)_2$, $C(=O)$, O, S, $S(O_2)$, $C(CH_3)_2$, $CH_2$, or $O(-Ph-)O$;
each of the $R_1$ moieties, independently, being H, $C_1$-$C_5$ alkyl, $C_1$-$C_5$ alkoxyl, phenyl, and phenyoxyl;
each of the n values, independently, being 0, 1, 2, or 3; and
each of the T moieties, independently, is a thermal labile side chain containing a —O— group linked to the carbonyl group in the $Ar_3$ moiety in a monomer A, and also containing at least one hydroxyl group;

evaporating the solvent to form a membrane;
cross-linking $Ar_3$ moieties via T moieties by covalent bonding therebetween to form a cross-linked membrane, the covalent bonding resulting from reaction between the hydroxyl group in a T moiety and the carbonyl group in an $Ar_3$ moiety; and
heating the cross-linked membrane so as to both decompose the T moieties and form covalent bonds between aryl rings in the $Ar_1$, $Ar_2$, and $Ar_3$ moieties,
wherein, if the grafted polyimides also contain the monomers B, the molar ratio of the monomers B to the monomers A is 0.11 to 99, and a monomer A and a monomer B are linked as follows:

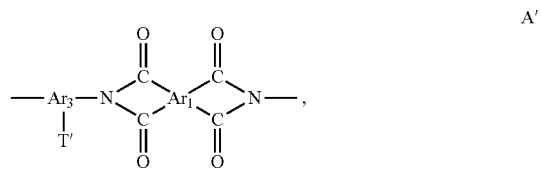

2. The method of claim 1, wherein the solution further includes ungrafted polyimides, having molecular weights of 10,000-300,000 and containing monomers A' and, optionally, also containing monomers B as defined in claim 1 above;
each of the monomers A', which are the same or different, having the following formula:

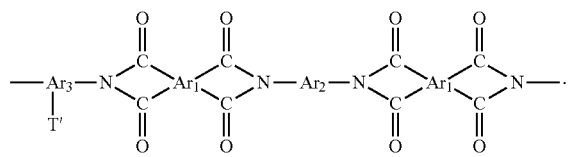

in which
each of the $Ar_1$ moieties and each of the $Ar_3$ moieties are defined in claim 1; and
T' is a —OH group, linked to the carbonyl group in the $Ar_3$ moiety in a monomer A', wherein, if the ungrafted polyimides also contain the monomers B, the molar ratio of the monomers B to the monomers A' is 0.11 to 99, and a monomer A' and a monomer B are linked as follows:

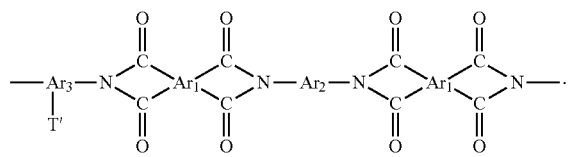

3. The method of claim 2, wherein the grafted polyimides have molecular weights of 30,000-70,000, the ungrafted polyimides have molecular weights of 30,000-70,000, the molar ratio of the monomers B to the monomers A is 0.33 to 19, and the molar ratio of the monomers B to the monomers A' is 0.33 to 19.

4. The method of claim 2, wherein each of the T moieties, independently, is $R_2$—$CH_2$—O—, $R_2$ being $C_nH_{2n+2-x}$ $(OH)_x$, in which x is 2-30 and n is 2-30.

5. The method of claim 2, wherein each of the T moieties, independently, is glucose or

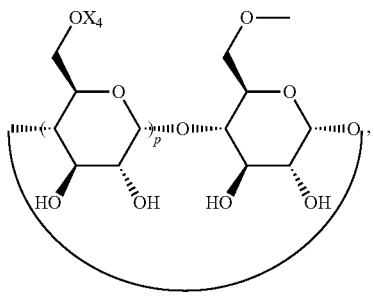

in which p is 1-9; and each of the $X_4$ moieties, independently, is H, $C_1$-$C_5$ alkyl, $C_1$-$C_5$ alkoxyl, phenyl, or phenyoxyl.

6. The method of claim 5, wherein p is 6 and $X_4$ is H.

7. The method of claim 6, wherein $Ar_1$ is

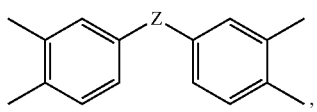

Z being $C(CF_3)_2$; $Ar_2$ is

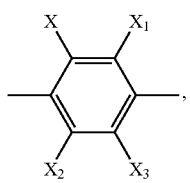

each of X, $X_1$, $X_2$, and $X_3$, being $CH_3$; $Ar_3$ is

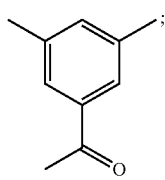

the molar ratio of the monomers B to the monomers A is 9; and the molar ratio of the monomers B to the monomers A' is 9.

8. The method of claim 5, wherein p is 0.

9. The method of claim 8, wherein $Ar_1$ is

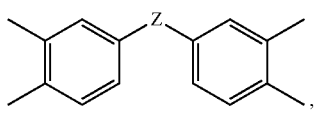

Z being $C(CF_3)_2$; $Ar_2$ is

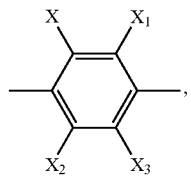

X, $X_1$, $X_2$, and $X_3$, being $CH_3$; $Ar_3$ is

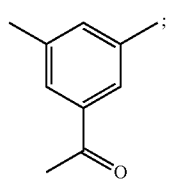

the molar ratio of the monomers B to monomers A is 1, and the molar ratio of the monomers B to the monomers A' is 1.

10. The method of claim 2, wherein the cross-linking step is induced thermally.

11. The method of claim 2, wherein the heating step is performed at 350-450° C.

12. The method of claim 1, wherein the grafted polyimides have molecular weights of 30,000-70,000 and the molar ratio of the monomers B to the monomers A is 0.33 to 19.

13. The method of claim 1, wherein each of the T moieties, independently, is $R_2$—$CH_2$—O —, $R_2$ being $C_nH_{2n+2-x}$(OH)$_x$, in which x is 2-30 and n is 2-30.

14. The method of claim 1, wherein each of the T moieties, independently, is glucose or

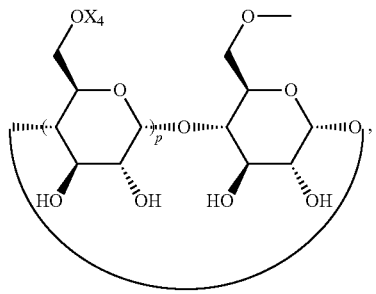

in which p is 1-9; and each of the $X_4$ moieties, independently, is H, $C_1$-$C_5$ alkyl, $C_1$-$C_5$ alkoxyl, phenyl, or phenyoxyl.

15. The method of claim 14, wherein p is 6 and $X_4$ is H.

16. The method of claim 15, wherein $Ar_1$ is

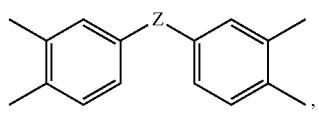

Z being $C(CF_3)_2$; $Ar_2$ is

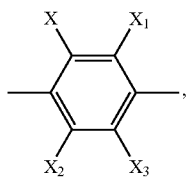

each of X, $X_1$, $X_2$, and $X_3$, being $CH_3$; $Ar_3$ is

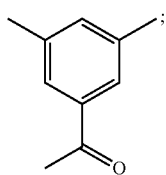

the molar ratio of the monomers B to the monomers A is 9, and the molar ratio of the monomers B to the monomers A' is 9.

17. The method of claim 14, wherein p is 0.
18. The method of claim 17, wherein $Ar_1$ is

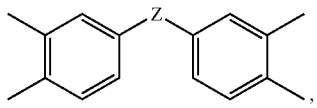

Z being $C(CF_3)_2$; $Ar_2$ is

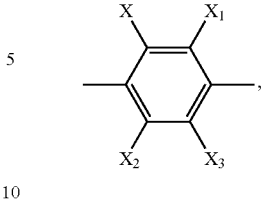

X, $X_1$, $X_2$, and $X_3$, being $CH_3$; $Ar_3$ is

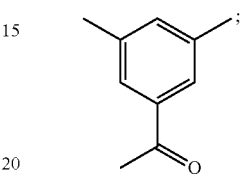

the molar ratio of the monomers B to monomers A is 1, and the molar ratio of the monomers B to the monomers A' is 1.

19. The method of claim 1, wherein the cross-linking step is induced thermally.
20. The method of claim 1, wherein the heating step is performed at 350-450° C.
21. A polyimide membrane prepared by the method of claim 1.
22. A polyimide membrane prepared by the method of claim 2.

* * * * *